H. J. APPLETON.
AUTOMATIC TIRE PUMP.
APPLICATION FILED MAR. 22, 1919.

1,329,876.

Patented Feb. 3, 1920.
4 SHEETS—SHEET 1.

INVENTOR
Henry J. Appleton
BY
Stuart L. Barnes
HIS ATTORNEY.

H. J. APPLETON.
AUTOMATIC TIRE PUMP.
APPLICATION FILED MAR. 22, 1919.
1,329,876.
Patented Feb. 3, 1920.
4 SHEETS—SHEET 2.
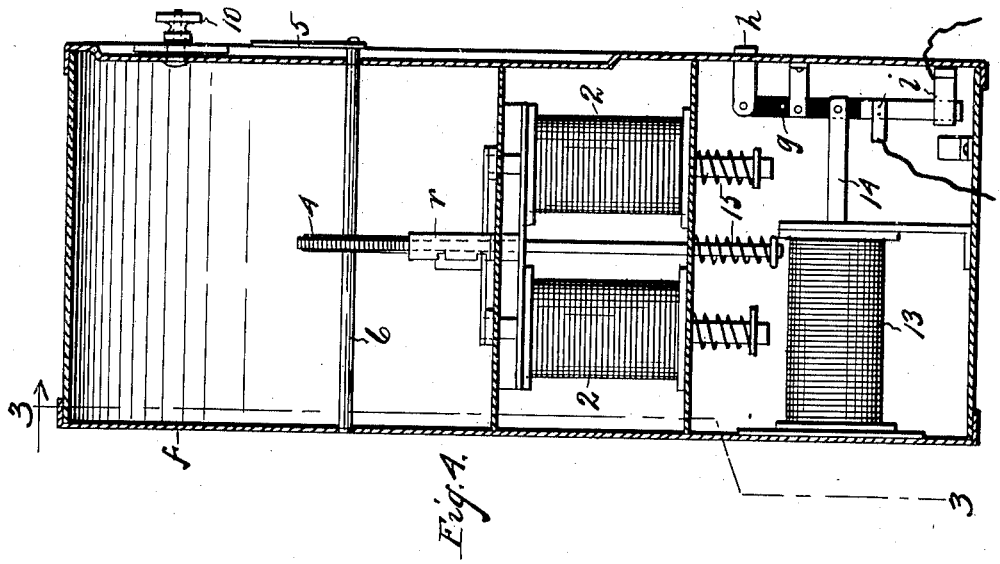
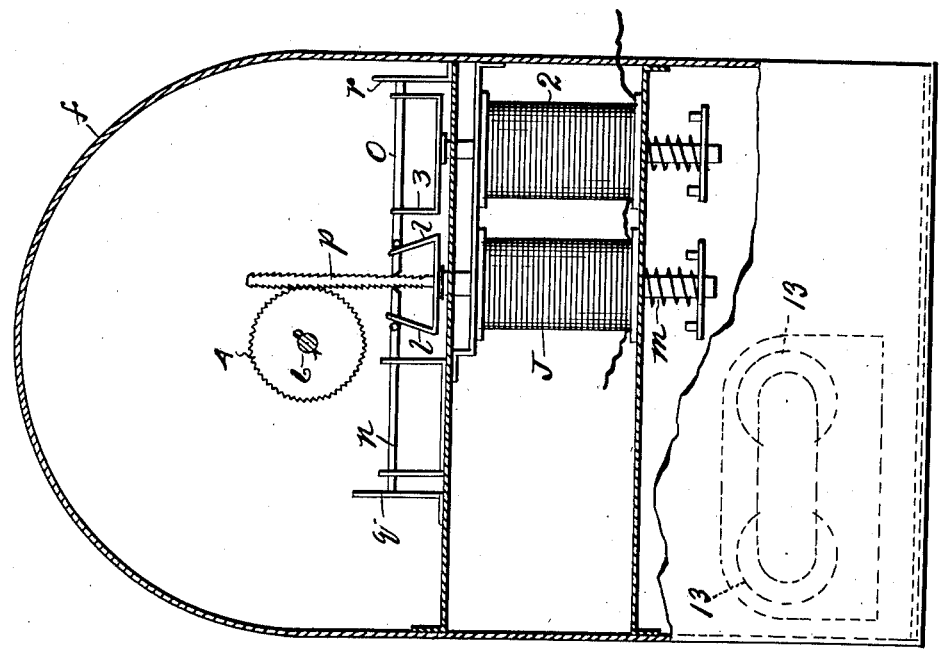
INVENTOR
Henry J. Appleton
BY
Stuart L. Barnes
HIS ATTORNEY.

H. J. APPLETON.
AUTOMATIC TIRE PUMP.
APPLICATION FILED MAR. 22, 1919.
1,329,876.
Patented Feb. 3, 1920.
4 SHEETS—SHEET 3.
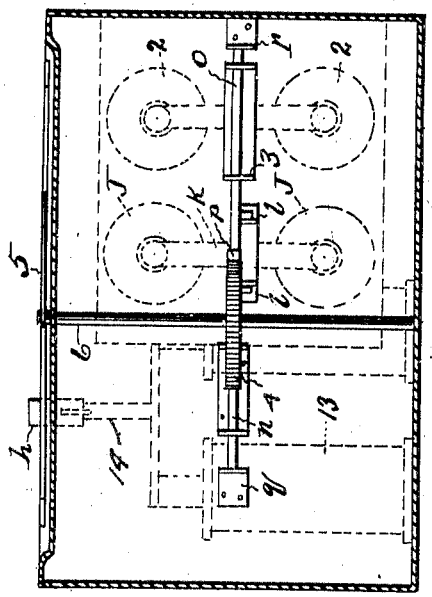
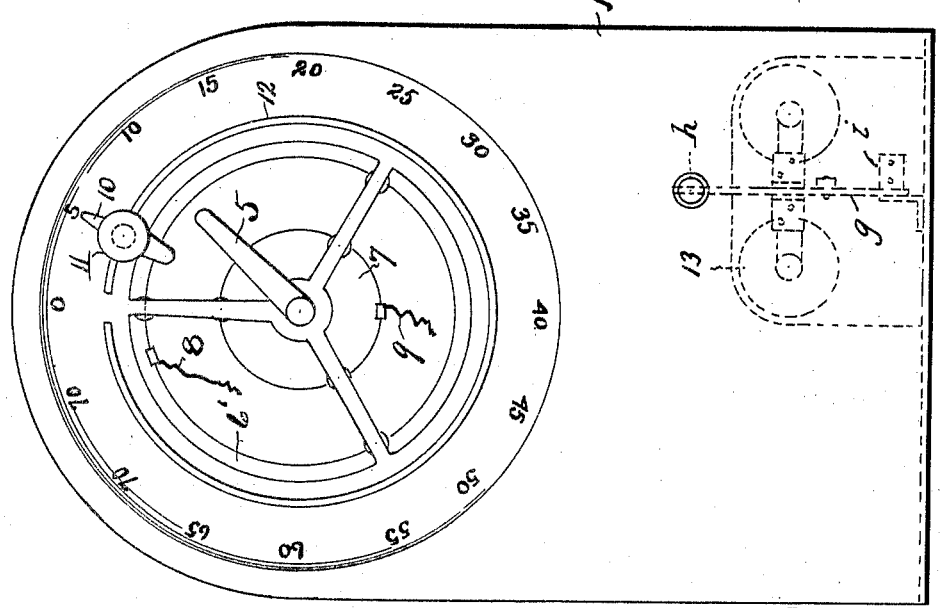
INVENTOR
Henry J. Appleton
BY
Stuart L. Barnes
HIS ATTORNEY.

H. J. APPLETON.
AUTOMATIC TIRE PUMP.
APPLICATION FILED MAR. 22, 1919.
1,329,876.
Patented Feb. 3, 1920.
4 SHEETS—SHEET 4.
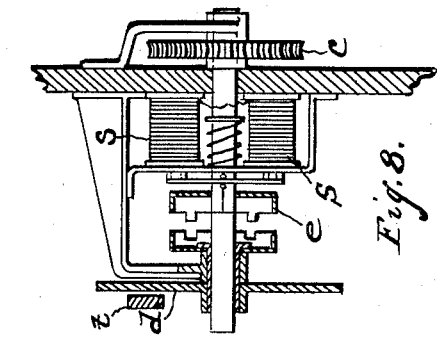
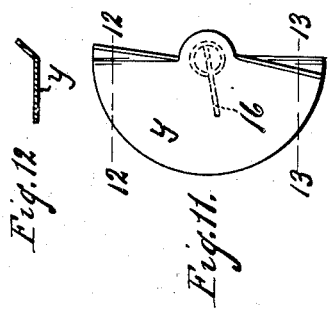
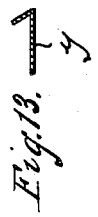
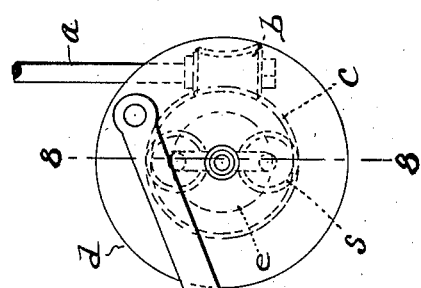
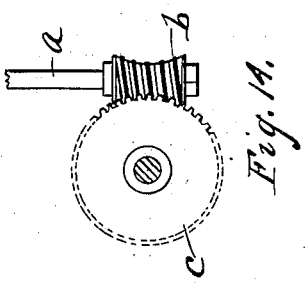
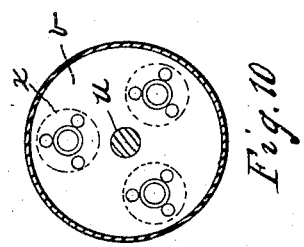
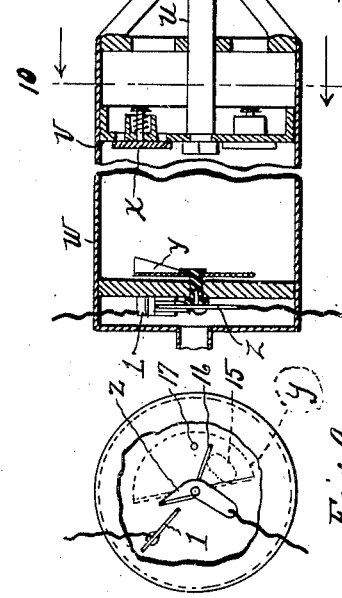
INVENTOR
Henry J. Appleton
BY
Stuart C. Barnes
HIS ATTORNEY.

UNITED STATES PATENT OFFICE.

HENRY J. APPLETON, OF DETROIT, MICHIGAN.

AUTOMATIC TIRE-PUMP.

1,329,876.  Specification of Letters Patent.  Patented Feb. 3, 1920.

Application filed March 22, 1919. Serial No. 284,417.

*To all whom it may concern:*

Be it known that I, HENRY J. APPLETON, a citizen of the United States, residing at Detroit, county of Wayne, State of Michigan, have invented a new and useful Improvement in Automatic Tire-Pumps, of which the following is a specification.

This invention relates to tire pumps and has for its object a tire pump which can be set to deliver to a tire a given quantity of air. When this quantity has been delivered to the tire the pump is automatically cut out. Of course, the pump could be used in other connections and it may, therefore, be regarded as a pump that can be automatically set to stop after giving a determined amount of compressed air. The features of the invention will be best understood after a clear understanding of the invention is had.

In the drawings,—

Fig. 3 is a cross section through the casing that is attached to the instrument board of the car, taken on the line 3—3 of Fig. 4.

Fig. 4 is a cross section through the same casing at a right angle to that of Fig. 3.

Fig. 5 is a front elevation of this casing.

Fig. 6 is a horizontal section of the casing showing the interior parts in plan view.

Fig. 7 is a longitudinal section of the pump showing its driving connections in elevation.

Fig. 8 is a section taken on the section line 8—8 of Fig. 7.

Fig. 9 is a view of the switching chamber in the pump by breaking away the left hand end wall of Fig. 7.

Fig. 10 is a plan view of the pump plunger, being a section taken on the line 10—10 of Fig. 7.

Fig. 11 is an elevation of the fan used as the switch actuator in the pump.

Fig. 12 is a section of the same on the line 12—12 of Fig. 11.

Fig. 13 is a section of the same on the line 13—13 of Fig. 11.

Fig. 14 is a detail of the worm drive for the pump crankshaft.

Figure 1:
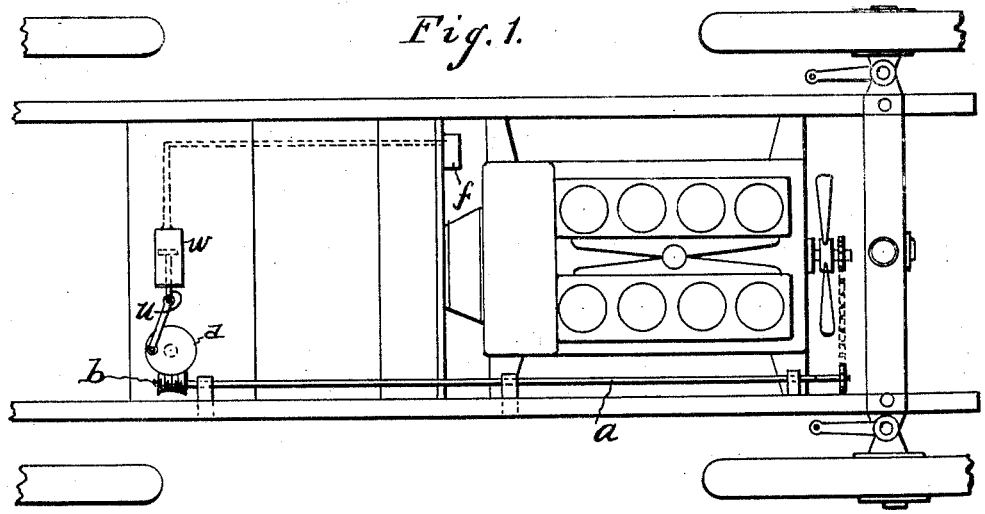
Figure 1 is a plan view of an automobile showing how the pump is mounted.

Referring to Fig. 1, the chassis of an automobile is shown. Connected with the fan shaft is the shafting $a$ that leads back under the seat of the car, where is a worm drive $b$ that drives a spiral gear $c$ (Fig. 8) which connects with the crank disk $d$ by means of the jaw clutch $e$. A pair of solenoids $s$ will, when energized, engage the jaw clutch parts as against the pull of the spring shown in Fig. 8.

On the instrument board of the car indicated by the letter $f$ is a casing which incloses the parts shown in Figs. 3 to 6 inclusive. $g$ is a bus bar having a finger piece $h$ protruding from the front of the housing as shown in Fig. 4. In this position the bus bar completes a circuit with the terminal $i$, which can be traced by referring to the diagrammatic view, Fig. 2. It will be found that this circuit leads through the battery and through the solenoid $j$, which is also shown in Fig. 3 and comprises a pair of solenoids (see plan view, Fig. 6) connected by a bar $k$ which has attached to it the releasing bracket $l$. When the current goes through the two solenoids $j$ they are energized to pull down this bracket $l$ against the pull of the spring $m$ (Fig. 3). This allows the two pawl bars $n$ and $o$ to be forced into contact with the rack teeth of the rack bar $p$ by the influence of the flat springs $q$ and $r$, which bear respectively against the outer ends of the pawl bars $n$ and $o$.

Adverting again to the circuit completed by the bus bar (diagrammatic view 2), it will be found that the same circuit runs around the solenoids $s$, which control the clutch parts $e$. Hence simultaneously when the bus bar establishes a circuit, the pawl bars $n$ and $o$ are released by the bracket $l$ and the clutch parts are brought into engagement to establish a driving connection for the pump.

The crank disk $d$ (Fig. 7) through the connecting arm $t$ and the plunger rod $u$ reciprocates back and forth the plunger $v$ in the pump cylinder $w$. In this plunger are three spring-controlled valves $x$ which are driven closed against the three ports that they control when the plunger is driven forward in the cylinder and are opened by the rushing air when the plunger is reversed in the cylinder and thereby admit a new charge of air on the return stroke of the plunger. As the plunger advances on the air taken in the cylinder the air is compressed and the fan $y$ caused to revolve, opening the port 15 and distorting the wire spring 16 against the post 17 to store energy to return the fan valve and switch to its initial position when the pump plunger turns onto its return stroke.

On the outside of the head of the cylinder is a switching chamber suitably inclosed by a casing that forms the cylinder wall and attached to this fan is a switch arm z adapted to contact the terminal 1. Now refer to diagrammatic view, Fig. 2. It will be seen that this switch arm z and terminal 1 when in contact closes a circuit through the solenoid 2 and through the battery.

Now again refer to Figs. 3 and 4, and it will be seen that the solenoids 2 are a pair of solenoids which support the bracket 3 (Fig. 3) which horizontally guides and carries the pawl bar o. However, as the contact between the switch arm z and the terminal 1 is only momentary, the solenoids 2 are only momentarily energized so that the pawl bar is only lifted one notch of the rack bar at a time and falls back. This small lift of the solenoid plunger can be effected either by the only momentary energization or the power of the solenoid may be weak and hence its lifting capacity limited to this extent. The pawl bar n serves to drop in under the next notch and keep the rack bar p raised in its new position. This rack bar meshing with the pinion 4 connects with the arm 5 through the shaft 6 (Fig. 4). This arm 5 is on the outside of the casing f and swings over a face of graduations on the portion of the casing f that protrudes through the instrument board of the car. On the face of this dial are two rings 6' and 7, 6' the outer ring, is connected with the wire 8. 7, the inner ring, is in electrical connection with the wire 9. The arm 5 is in electrical connection with this inner ring 7 while the movable terminal 10 is in movable connection with the outer ring 6' and may be moved around the dial and supported at any given position by means of the set screw 11 and the near annular slot 12. Hence the pinion 4 revolving in response to the lifting of the bar p due to the working of the pump revolves the switch arm 5 until it finally contacts the terminal 10 at whatever point the terminal has been set around the dial. This establishes a current of electricity through the wires 8 and 9.

Figure 2:
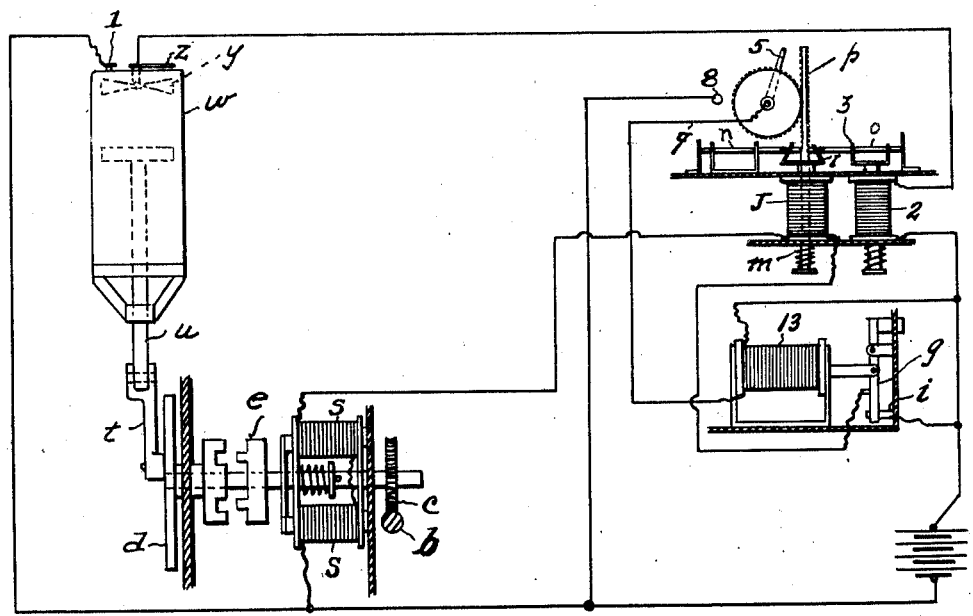
Fig. 2 is a diagrammatic view of the apparatus.

Now refer to the diagrammatic view, Fig. 2, and it will be seen that this circuit is traceable through the battery through the solenoid 13 and back to the switch. The solenoids 13 are clearly indicated in Figs. 3 and 4. They operate a solenoid plunger 14 which when energized pulls the bus-bar g out of contact. This, of course, instantly deenergizes the magnets s which control the clutch e and the clutch immediately disengages and the power is cut off. At the same time it deënergizes the solenoids j which control the "V" bracket l. Thereupon the springs m pull up the "V"-like bracket l which through the pins on the pawl bars n and o spread these bars against the influence of the flat springs q and r. This allows the spring 15 (Fig. 4) to draw down the rack bar p, reverse the movement of the pinion 4, and draw the switch arm 5 back to zero. This, in fact, is the re-setting apparatus.

The quantity of air compressed with each movement of the plunger of the air pump is known. Consequently the amount of air that will be delivered from the compressor is directly proportional to the number of reciprocations of the plunger. Each reciprocation moves the rack bar p and the hand 5 a given distance. It will, therefore, be evident that the dial can be calibrated so that a given distance on the dial will indicate the delivery of a given quantity of air from the compressor. Hence the terminal 10 can be set to cut out the pump when a certain amount of air has been delivered.

What I claim is:

1. An automatically-controlled air compressor, having in combination, a compressing pump, a control for shutting the same off, a dial with graduations to indicate air delivered from the pump, a pointer swinging over the dial, a member which can be set on the dial, electrical connections with the pointer and said member set on the dial completing an electrical circuit to shut off the control of the motor, and means automatically operated when the control is shut off for re-setting the hand on the dial.

2. An automatically-controlled air compressor, having in combination, a compressing pump, a control for shutting off the same, a dial provided with graduations to indicate air delivered from the pump, a terminal which can be adjusted along the calibrated dial, a pointer adapted to swing over the dial and operated by the air compressor to indicate air delivered from the air pump, electrical connections which with the hand on the dial and the terminal on the dial establishes a circuit adapted to operate the control for the pump, and means for re-setting the hand on the dial to zero.

3. An automatically-controlled air compressor, having in combination, a compressing pump, a control for shutting off the same, a dial provided with graduations to indicate air delivered from the pump, a terminal which can be adjustably set on the calibrated dial, a hand adapted to swing over the dial, connections between the air compressor and the said hand including a rack bar and a pinion, a pawl bar for driving said rack bar, a second pawl bar for retaining the rack bar in the position to which it is driven, electrical connections which with the terminal and the hand form a circuit to operate the control for the air compressor, a bracket with a pair of tapered arms which are held out of contact with the pawl bars when the same are operating the rack bar but which is engaged with the pawl bars to disengage them from the rack bar when the pump control is shut off, and means for returning the rack bar to its original position to re-set the hand to zero on the dial.

4. An automatically-controlled air compressor, having in combination, an air pump, a dial calibrated to indicate air delivered to the air pump, a hand on the dial in the form of a switch arm responsive to the air deliveries from the air pump, a continuously running shaft, a clutch between the shaft and the air pump, an electric terminal movable and settable along the calibrations on the dial which when engaged by the switch arm closes a circuit, the said circuit including a solenoid, and a second circuit including a hand switch which energizes and includes a solenoid to hold the clutch parts in engagement and which second circuit is broken when the solenoid in the first circuit is energized by the closing of this circuit by contact of the switch arm and terminal on the calibrated dial.

5. An automatically-controlled air compressor, having in combination, an air pump, a calibrated dial, a switch arm thereon, a terminal that may be adjusted along the dial, a switch in connection with the air pump momentarily closed at each reciprocation of the air pump, the remainder of the circuit in which the last-mentioned switch is included and which embraces a solenoid, a pawl bar intermittently raised by the action of said solenoid, a rack engaged by the pawl bar, a pinion intermeshing with the rack and attached to the switch hand on the dial, and connections for stopping the action of the pump when the switch arm and the terminal on the dial contact.

6. An automatically-controlled air compressor, having in combination, an air pump, a calibrated dial to indicate units of air delivered from the air pump, a terminal adjustable along graduations on the dial, a switch hand movable over the dial and adapted to strike the said terminal, connections between the terminal and the pump for stopping the pump when the switch hand strikes the terminal, a switch momentarily closed by the pump at each reciprocation, the remainder of the circuit in which the said switch is included including a solenoid, a pawl bar raised by the intermittent energization of the solenoid, a rack raised by the pawl bar, a second pawl bar engaging the opposite side of the rack for holding the rack in its raised position each time, a spring for normally pulling down the rack, a pinion intermeshing with the rack and connected with the switch arm on the calibrated dial, a switch and electric circuit which starts the action of the pump and includes a solenoid provided with a bracket and a plunger, and a spring for normally keeping the bracket in position to disengage the two pawl bars whereby when the last-mentioned circuit is broken and the pump stops the spring on the rack bar is allowed to re-set the hand on the dial to zero because of the release of the pawl bars from engagement with the rack.

In witness whereof I have hereunto set my hand on the 15th day of March, 1919.

HENRY J. APPLETON.